United States Patent
Fujino et al.

(10) Patent No.: US 11,888,538 B2
(45) Date of Patent: Jan. 30, 2024

(54) RECEIVING APPARATUS

(71) Applicant: NIPPON TELEGRAPH AND TELEPHONE CORPORATION, Tokyo (JP)

(72) Inventors: Yosuke Fujino, Musashino (JP); Hiroyuki Fukumoto, Musashino (JP); Kazunori Akabane, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/774,451

(22) PCT Filed: Nov. 12, 2019

(86) PCT No.: PCT/JP2019/044394
§ 371 (c)(1),
(2) Date: May 4, 2022

(87) PCT Pub. No.: WO2021/095127
PCT Pub. Date: May 20, 2021

(65) Prior Publication Data
US 2022/0393778 A1  Dec. 8, 2022

(51) Int. Cl.
*H04B 17/21* (2015.01)
*H04B 11/00* (2006.01)
*H04B 13/02* (2006.01)

(52) U.S. Cl.
CPC ............. *H04B 17/21* (2015.01); *H04B 11/00* (2013.01); *H04B 13/02* (2013.01)

(58) Field of Classification Search
CPC ......... H04B 17/21; H04B 11/00; H04B 13/02
See application file for complete search history.

(56) References Cited

U.S. PATENT DOCUMENTS

| 4,947,425 | A | * | 8/1990 | Grizmala | ............... | H04B 3/466 |
|           |   |   |        |          |                | 370/290    |
| 2002/0012391 | A1 | | 1/2002 | Ahn | | |

(Continued)

FOREIGN PATENT DOCUMENTS

| CN | 111884970 A | * | 11/2020 | | |
| CN | 114667693 A | * | 6/2022 | ............. | H04B 11/00 |

(Continued)

OTHER PUBLICATIONS

Hiroshi Ochi, Research on Underwater High-Speed Acoustic Transmission of Digital Data Using Wideband Transducers, Doctoral Dissertation, The university of Electro-Communications, Mar. 2009.

(Continued)

*Primary Examiner* — Daniel Pihulic
(74) *Attorney, Agent, or Firm* — Harness, Dickey & Pierce, P.L.C.

(57) ABSTRACT

A receiving apparatus includes: M receivers configured to receive signals based on sound waves propagating in water; M FIR filters configured to perform waveform operation on the signals received by the receivers; a combiner configured to combine output signals of the M FIR filters; and a filter coefficient calculation portion configured to calculate a tap coefficient of the M FIR filters so as to reduce an error of the output signals combined by the combiner. The M FIR filters have a tap length that is shorter than a delay spread that is a possible range between a time of arrival of a direct wave and a time of arrival of a delayed wave of the sound waves.

5 Claims, 4 Drawing Sheets

(56) References Cited

U.S. PATENT DOCUMENTS

| | | | |
|---|---|---|---|
| 2002/0159505 A1 | 10/2002 | Hayashibara | |
| 2009/0122899 A1* | 5/2009 | Kolu .................. | H04B 17/21 |
| | | | 375/267 |
| 2017/0163356 A1* | 6/2017 | Chen .................. | H04B 17/17 |
| 2022/0393778 A1* | 12/2022 | Fujino ................ | H04B 13/02 |

FOREIGN PATENT DOCUMENTS

| | | | | |
|---|---|---|---|---|
| EP | 4060908 A1 * | 9/2022 | ............. | H04B 11/00 |
| JP | 2001257627 A | 9/2001 | | |
| JP | 2002026780 A | 1/2002 | | |
| JP | 4113651 B2 * | 7/2008 | | |
| KR | 20220079628 A * | 6/2022 | | |
| RU | 2782244 C1 * | 10/2022 | ............. | H04B 11/00 |
| WO | WO-2021095127 A1 * | 5/2021 | ............. | H04B 11/00 |

OTHER PUBLICATIONS

Kazunori Hayashi et al., A Spatio-Temporal Equalization Method with Cascade Configuration of an Adaptive Antenna Array and a Decision Feedback Equalizer, IEICE Transactions, B, vol. J85-B, No. 6, pp. 900-909, 2002.

* cited by examiner

| | CONVENTIONAL RECEIVING APPARATUS | RECEIVING APPARATUS (PRESENT EMBODIMENT) |
|---|---|---|
| CARRIER FREQUENCY | 300kHz | |
| SYMBOL RATE | 200kbaud | |
| MODULATION SCHEME | QPSK | |
| PROPAGATION MODEL | 2-PATH MODEL (DIRECT WAVE AND DELAYED WAVE) | |
| SNR | 15dB | |
| DELAY TIME | 6.7 MS (CORRESPONDING TO 10M PATH DIFFERENCE) | |
| DELAYED WAVE LEVEL | −4 dB (ASSUMING SEA SURFACE REFLECTION) | |
| ANGLE OF INCIDENCE | 30 DEGREES | |
| NUMBER OF RECEIVERS | 1 | 2 |
| RECEIVER INTERVAL | − | 0.1m |
| NUMBER OF TAPS | 9500 (CORRESPONDING TO 47.5 MS) | 54 (CORRESPONDING TO 0.27 MS) |
| FILTER UPDATE ALGORITHM | RLS | |

Fig. 3

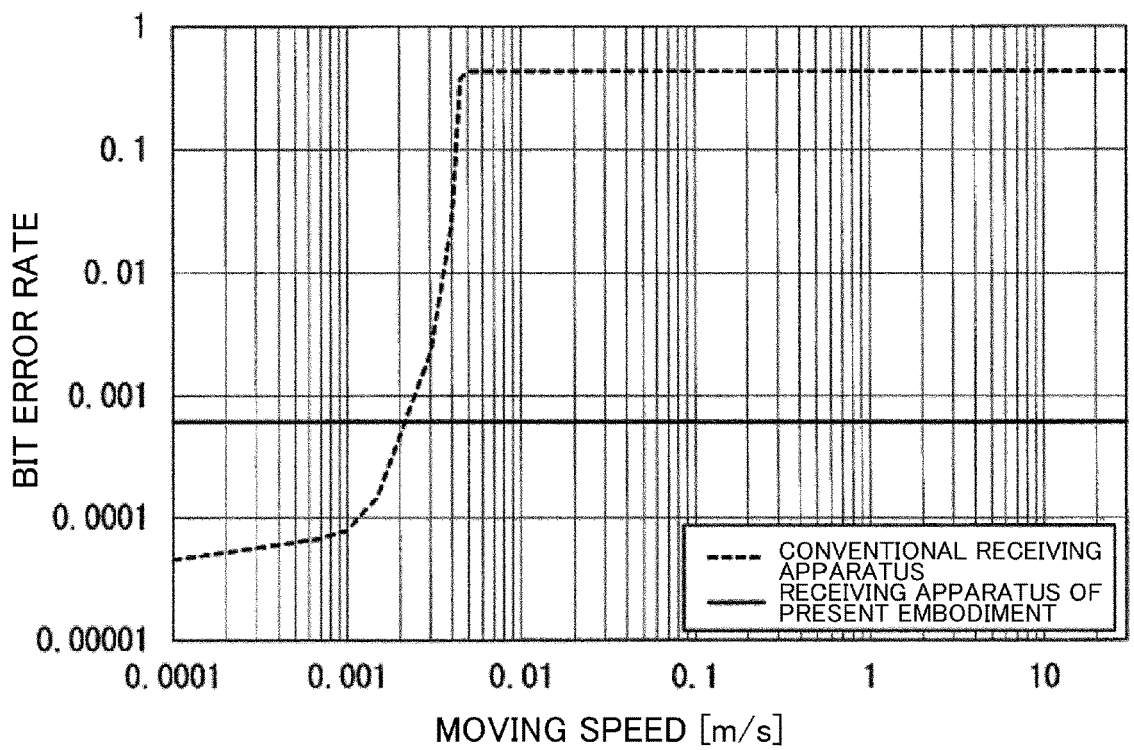

Fig. 4

RECEIVING APPARATUS

CROSS-REFERENCE TO RELATED APPLICATIONS

This application is a 371 U.S. National Phase of International Application No. PCT/JP2019/044394 filed on Nov. 12, 2019. The entire disclosure of the above application is incorporated herein by reference.

TECHNICAL FIELD

The present invention relates to a technique for receiving sound waves in water.

BACKGROUND ART

In water (especially in the sea), the absorption and attenuation of electromagnetic waves are extremely large. For this reason, sound waves are generally used as carrier waves for wireless transmission. However, sound waves have an extremely slow propagation speed as compared to electromagnetic waves. Consequently, the possible range of delay time between delayed waves that arrive after being reflected on the sea surface, the seabed, an underwater structure, or the like and direct waves that arrive without being reflected (hereinafter referred to as "delay spread") is very large. Severe waveform distortion occurs when signals with long delay times are superimposed. Furthermore, the slow propagation speed increases the Doppler frequency difference (hereinafter referred to as "Doppler spread") between direct waves and delayed waves due to the influence of sea currents and waves. As the phase difference between the direct wave and the delayed wave changes, the waveform distortion pattern (hereinafter referred to as "propagation path characteristic") changes with time. The magnitude of the delay spread and the magnitude of the Doppler spread are both proportional to the reciprocal of the propagation speed. Accordingly, the delay spread and Doppler spread of sound waves used in water are about 200,000 times greater than the delay spread and Doppler spread of electromagnetic waves used in the air under the same conditions. For this reason, in order to enable information transmission using sound waves, continuous compensation for the waveform distortion, which changes rapidly with time, is required.

As a technique for solving such a problem inherent to underwater acoustic communication, an adaptive equalization technique has been proposed that adaptively calculates and uses an FIR filter with the inverse characteristic of the propagation path characteristic between transmitters and receivers (for example, NPL 1).

FIG. 5 is a diagram showing a specific example of a receiving apparatus 90 that uses the adaptive equalization technique described in NPL 1. The receiving apparatus 10 includes a receiver 901, a conversion portion 902, a finite impulse response (FIR) filter 903, a symbol estimation portion 904, and a filter coefficient calculation portion 905. The receiver 901 converts sound waves in water into electrical signals. The conversion portion 902 samples the signals received by the receiver 901. The FIR filter 903 performs waveform operation on the sampled signal. The symbol estimation portion 904 estimates the transmitted symbols based on the signal that has passed through the FIR filter 903. The filter coefficient calculation portion 905 adaptively calculates the tap coefficient of the FIR filter 903 such that the error between the signal passing through the FIR filter 903 and the estimated symbols is minimized. The FIR filter 903 has a tap length that is long enough to cover the delay spread. That is, when the delay spread is $\sigma\_T$ seconds and the sampling rate of the FIR filter 903 is $f\_s$ hertz, the number of taps N_tap is expressed by Expression (1) below.

[Math. 1]

$$N\_tap > \sigma\_T * f\_s \qquad \text{Expression (1)}$$

The design of the number of taps N_tap is described on pages 33 and 80 of NPL 1 described above.

As described above, the FIR filter 903 that covers a time length longer than the delay spread is adaptively optimized. This optimization enables the FIR filter 903 to compensate for the waveform distortion generated by the superimposition of the direct wave and the delayed wave. That is, it is possible to dynamically configure an equalization filter having the inverse characteristic of the propagation path characteristic. Such processing compensates for the severe waveform distortion, which changes with time.

As described in NPL 1, a configuration using a plurality of receivers 901 and a plurality of FIR filters 903 connected to the receivers 901 has also been proposed. In this configuration, the number of taps of the FIR filters 903 is also designed to satisfy Expression (1) as in the above-described configuration. Each FIR filter 903 operates to compensate for the waveform distortion generated between the corresponding transmitter and receiver. That is, each FIR filter 903 operates so as to form an equalization filter with the inverse characteristic of the propagation path characteristic, and the plurality of receivers 901 are used for the purpose of obtaining a diversity effect.

CITATION LIST

Non Patent Literature

[NPL 1] Hiroshi Ochi, "Research on Underwater High-Speed Acoustic Transmission of Digital Data Using Wideband Transducers", The University of Electro-Communications Doctoral thesis, March 2009

SUMMARY OF THE INVENTION

Technical Problem

In principle, the time required to estimate the coefficient of the filter having the inverse characteristic of the propagation path characteristic is longer than the delay spread. On the other hand, the propagation path characteristic changes with time proportional to the reciprocal of the Doppler spread. Thus, when both the Doppler spread and the delay spread are large, the propagation path characteristic changes while the coefficient of the filter having the inverse characteristic of the propagation path characteristic is being estimated. The compensation for the waveform distortion is therefore difficult to achieve with the conventional technique.

The magnitude of Doppler spread is proportional to the frequency and the moving speed that are used. Consequently, when a high-frequency band is used for high-speed communication, or when the transmitter or receiver moves at high speed, it is difficult to sufficiently compensate for the waveform distortion with the conventional technique. As a result, information cannot be transmitted. For this reason, the communication speed of conventional underwater acoustic devices has been limited to several tens of kbps. It has therefore been difficult to perform communication using underwater acoustic devices in a high-speed moving environment.

In view of the above circumstances, it is an objective of the present invention to provide a technique that can reduce the influence of waveform distortion caused by delay spread.

Means for Solving the Problem

One aspect of the present invention is a receiving apparatus including: M receivers configured to receive signals based on sound waves propagating in water; M FIR filters configured to perform waveform operation on the signals received by the receivers; a combiner configured to combine output signals of the M FIR filters; and a filter coefficient calculator configured to calculate a tap coefficient of the M FIR filters so as to reduce an error of the output signals combined by the combiner. The M FIR filters have a tap length that is shorter than a delay spread that is a possible range between a time of arrival of a direct wave and a time of arrival of a delayed wave of the sound waves.

Effects of the Invention

The present invention can reduce the influence of waveform distortion caused by delay spread.

BRIEF DESCRIPTION OF DRAWINGS

FIG. 3 is a table showing the operation conditions for simulations of a conventional receiving apparatus and the receiving apparatus 10 of the present embodiment.

FIG. 4 is a graph showing the results of simulations performed under the operation conditions shown in FIG. 3.

DESCRIPTION OF EMBODIMENTS

Referring to drawings, an embodiment of a receiving apparatus of the present invention is now described in detail.

[Summary]

Figure 1:
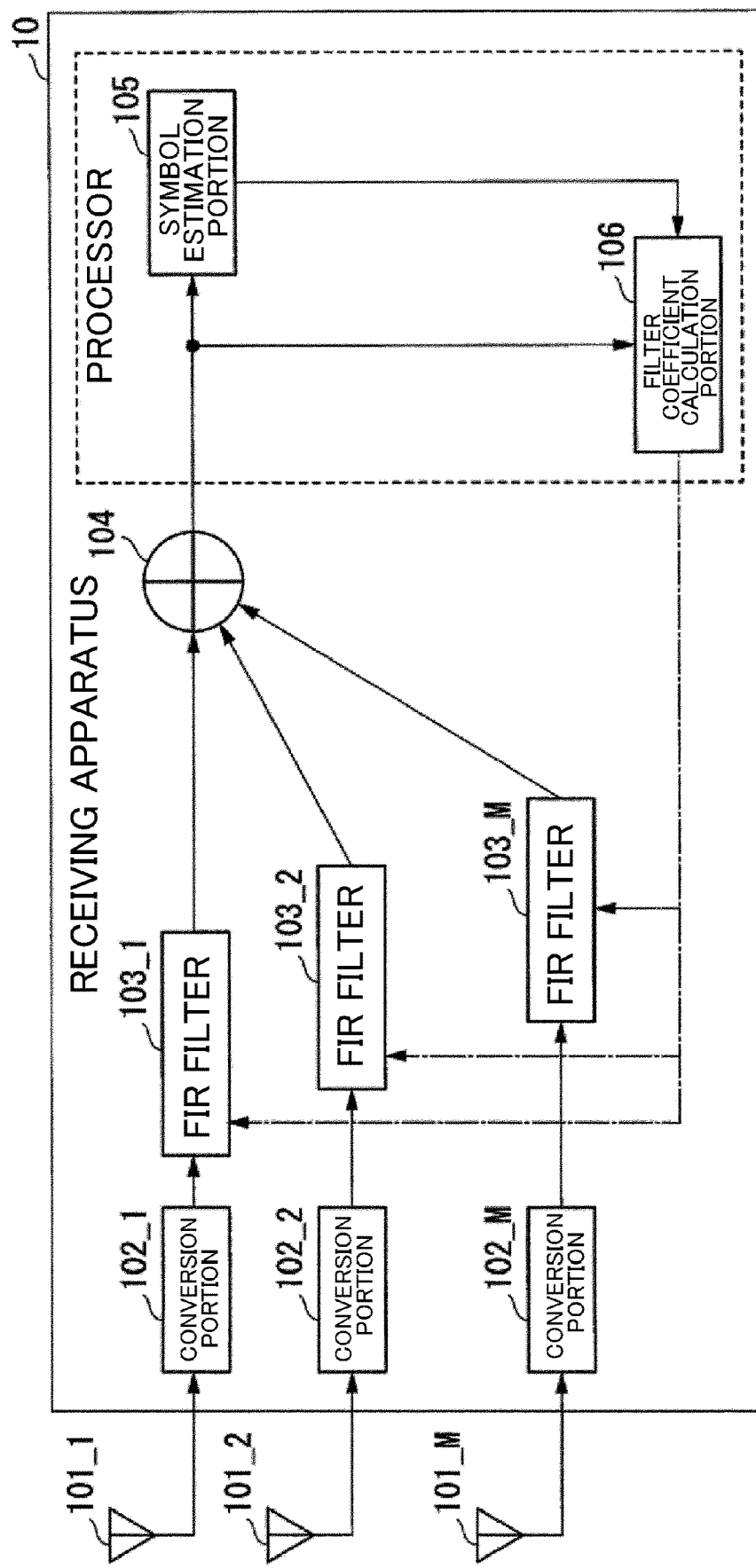
FIG. 1 is a schematic block diagram showing an outline of a functional configuration of a receiving apparatus 10 of the present invention.

FIG. 1 is a schematic block diagram showing an outline of a functional configuration of a receiving apparatus 10 of the present invention. The receiving apparatus 10 of the present invention includes a plurality of FIR filters 103 having a tap length sufficiently shorter than the assumed delay spread $\sigma\_T$. The tap length is a value obtained by multiplying the sampling time interval by the number of taps. Since the FIR filters 103 have such a tap length, the FIR filters 103 cannot form filters with the inverse characteristic of the waveform distortion. However, the receiving apparatus 10 of the present invention is capable of spatially removing the delayed wave, which is the root cause of the waveform distortion. Thus, it is possible to reduce the influence of waveform distortion caused by large delay spread. The details of the receiving apparatus 10 of the present invention are now described.

Details

The receiving apparatus 10 includes M receivers 101 (101_1 to 101_M), M conversion portions (converters) 102 (102_1 to 102_M), M FIR filters 103 (103_1 to 103_M), a combiner 104, a symbol estimation portion (symbol estimator) 105, and a filter coefficient calculation portion (filter coefficient calculator) 106. M is an integer greater than or equal to 2. It is desirable that the same number of receivers 101, conversion portions 102, and FIR filters 103 are provided. In the following description, when the configuration common to the M components of the same name is described, each component is indicated without using the reference "_1", for example. For example, a receiver is indicated as "receiver 101" instead of "receiver 101_1".

The receiver 101 receives sound waves propagating in water and converts the received sound waves into electrical signals.

The conversion portion 102 samples the electrical signal converted by the receiver 101. Specifically, this is performed as follows. The conversion portion 102 performs analog-to-digital conversion on the electrical signal converted by the receiver 101. Then, the conversion portion 102 performs frequency conversion on the digital signal obtained by the analog-to-digital conversion. Other configurations (modifications) may be used for the conversion portion 102, and modifications will be described below.

The FIR filter 103 performs waveform operation on the signal sampled by the conversion portion 102. The number of taps of the FIR filter 103 is set such that the tap length can be sufficiently shorter than the assumed delay spread $\sigma\_T$. That is, the number of taps of the FIR filter 103 is set based on the sampling time interval and the assumed delay spread $\sigma\_T$.

The combiner 104 combines M signals on which waveform operations are performed by the FIR filters 103.

The symbol estimation portion 105 estimates the symbols included in the sound waves that have propagated in water, based on the signals combined by the combiner 104. In other words, it estimates the symbols included in a received sound wave at the time when the sound wave was sent.

The filter coefficient calculation portion 106 adaptively calculates the tap coefficient of the M FIR filters 103. The tap coefficient is adaptively calculated such that the error is minimized between the symbols indicated by the output signal of the combiner 104 and the symbols estimated by the symbol estimation portion 105.

For example, when the distance that is the largest among the distances between the pairs of receivers 101 is d [m] and the sound velocity in water is c [m/s], the number of taps Ntap of each of the FIR filters 103_1 to 103_M is given by Expression 2 below. Since d is the largest distance among the distances between every pairs of the receivers 101 as described above, if all the distances between every pairs of the receivers 101 are uniform, the uniform distance is the value of d.

[Math. 2]

$$d/c * f\_s < N\_{tap} \ll \sigma\_T * f\_s \qquad \text{Expression (2)}$$

That is, the number of taps is designed such that the tap length is sufficiently shorter than the possible range of the delay time between a direct wave and a delayed wave (delay spread) and is longer than the difference in time of arrival between the receivers 101. This number of taps may be common to all M FIR filters 103. The length that is "sufficiently shorter than the delay spread ($\sigma\_T$)" may be, for example, one tenth of the delay spread or one hundredth of the delay spread. For example, a tap length may be defined as being sufficiently shorter than the delay spread when it is closer to the value of d/c than to the median value between the delay spread and the d/c value.

The number of taps is now described in detail. In the receiving apparatus 10 of the present embodiment, a plurality of receiving systems (combinations each including a receiver 101, a conversion portion 102, and an FIR filter 103) are provided. The tap length of each FIR filter 103 is set sufficiently shorter than the delay spread as described above. The filter coefficient calculation portion 106 adaptively optimizes the FIR filters 103 of these receiving systems. Since the tap length of the FIR filters 103_1 to 103_M is sufficiently shorter than the delay spread, these filters do not form filters with the inverse characteristic of waveform distortion. On the other hand, the receiving apparatus 10 of the present embodiment uses a waveform equalization approach that is completely different from the conventional approach, and spatially removes the delayed wave, which is the root cause of the waveform distortion.

Figure 2:
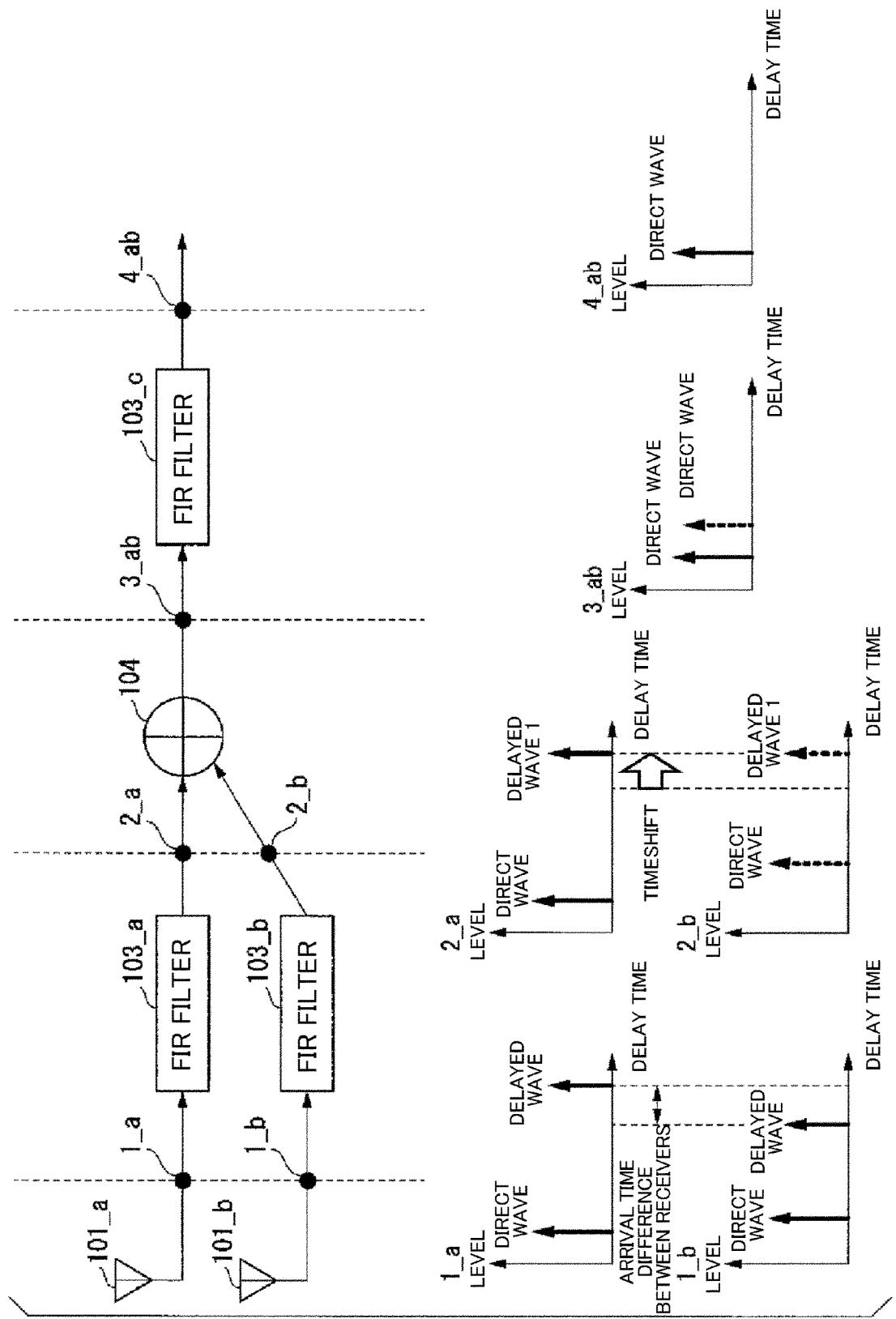
FIG. 2 is a diagram showing the principle of the operation of the receiving apparatus 10.
Figure 5:
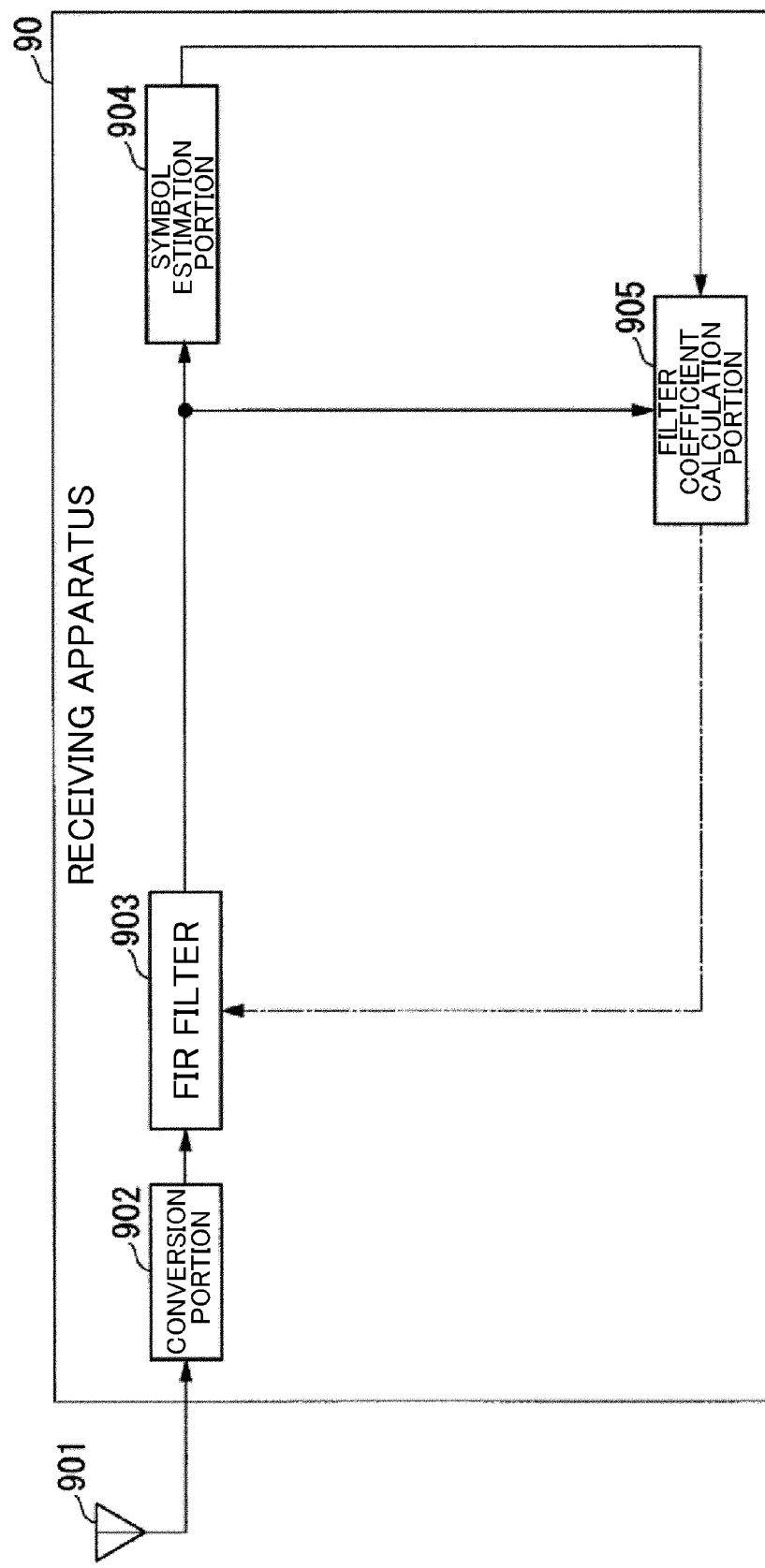
FIG. 5 is a diagram showing a specific example of a receiving apparatus 90 that uses the adaptive equalization technique described in NPL 1.

Details are given below. FIG. 2 is a diagram showing the principle of the operation of the receiving apparatus 10. In the example of FIG. 2, it is assumed that the transmission signal is a pulse signal, the number of receivers 101 is two (101_a and 101_b), and the number of delayed wave is one, for the sake of intuitive understanding. Also, for convenience, a configuration is described in which an additional FIR filter 103_c is connected in the subsequent stage of the combiner 104. In this configuration, each of the FIR filters 103_1 to 103_M is separated into two FIR filters 103a and 103b and placed in the stage subsequent to the combiner 104. That is, the configuration shown in FIG. 2 can perform an operation equivalent to that of the receiving apparatus 10.

As shown in FIG. 2, the FIR filter 103_a and the FIR filter 103_b in the preceding stage perform, as waveform operation, time shift and phase inversion so that the two delayed waves have the same time point and opposite phases. This waveform operation removes the delayed wave component in the combined signals. As a result, only the waveform distortion caused by the superimposition of the direct waves received by the two receivers 101_a and 101_b remains. Then, the FIR filter 101_c in the subsequent stage compensates for the waveform distortion caused by the superimposition of the direct waves. The waveform equalization is completed by the above processing.

Among the receivers 101, the difference between direct waves in arrival time and the difference between delayed waves in arrival time depend only on the distances of the transmitted and received waves and are thus remarkably shorter than the time difference between a direct wave and a delayed wave (delay spread). As such, the waveform operation described with reference to FIG. 2 can be achieved with the FIR filter 103 having an extremely short tap length. Additionally, among the receivers 101, the arrival time difference and phase difference between direct waves and the arrival time difference and phase difference between delayed waves are constant as long as the arrival directions of the direct waves and the delayed waves do not change. Thus, they are more stable than the time difference and phase difference between the direct wave and the delayed wave. For this reason, unlike a conventional receiving apparatus that estimates the inverse characteristic of the propagation path, which depends on the time difference and phase difference between the direct wave and the delayed wave, waveform equalization can be achieved in a significantly stable manner even when the propagation path has a large Doppler spread.

The filter coefficient calculation portion 106 does not have to use a new configuration to perform the operation explicitly described with reference to FIG. 2, and it is sufficient that the filter coefficient calculation portion 106 has the conventional function of a filter coefficient calculation portion. That is, the tap length of the FIR filter 103 is intentionally set to be sufficiently shorter than the delay spread and also longer than the arrival time difference between the receivers 101, resulting in the FIR filter 103 that performs the operation described with reference to FIG. 2. This is because such a configuration can theoretically perform the operation described with reference to FIG. 2 and the error of the signal output by performing the operation is minimized.

As described with reference to FIG. 2, an operation equivalent to that of the configuration of FIG. 1 can be theoretically performed with the configuration in which the FIR filter 103_c is further connected in the subsequent stage of the combiner 104. As such, either the configuration of FIG. 1 or the configuration of FIG. 2 may be used. However, in the cascade configuration of the FIR filter 103 as shown in FIG. 2, the error characteristic surface involves a fourth-order function, so that the configuration has a local minimum solution. Consequently, an adaptive algorithm such as LMS or RLS may cause convergence to an erroneous filter coefficient. This is also described in the following reference literature.

Reference literature: Kazunori Hayashi, Shinsuke Hara, "A Spatio-Temporal Equalization Method with Cascade Configuration of an Adaptive Antenna Array and a Decision Feedback Equalizer", The transactions of the Institute of Electronics, Information and Communication Engineers. B, Vol. J85-B, No. 6, pp. 900-909

For this reason, in practice, it is desirable to have a configuration that does not involve cascade connection of an FIR filter 103 in the subsequent stage as shown in FIG. 1. Each FIR filter 103 in the configuration of FIG. 1 has the functions of the FIR filter 103 in the preceding stage (103_a or 103_b) and the FIR filter 103 in the subsequent stage (103_c) in FIG. 2.

The receiving apparatus 10 of the present embodiment has an ability to remove delayed waves that are one less in number than M receivers 101. As such, the natural number "M" of the number of the receivers 101 and the FIR filters 103 (the number of receiving systems) is preferably a positive integer greater than the number of the delayed waves that are assumed to arrive at the receivers 101 (the delayed waves to be processed for removal).

FIG. 3 is a table showing the operation conditions for simulations of a conventional receiving apparatus and the receiving apparatus 10 of the present embodiment. FIG. 4 is a graph showing the results of simulations performed under the operation conditions shown in FIG. 3. Specifically, FIG. 4 shows the bit error rate after the symbol determination with respect to the moving speed, as the result of the simulations. As is evident from FIG. 4, in high-speed communication of 400 kbps (200 kbaud, QPSK), the conventional receiving apparatus cannot update the filter in time when the moving speed exceeds about 0.001 m/s, and the bit error rate starts to suffer. Accordingly, it is not possible to follow slight changes in the propagation path such as waves and tidal currents, indicating that communication is difficult in practical use even in a fixed environment. In contrast, the receiving apparatus 10 according to the present embodiment can maintain a bit error rate of 0.1% or less even in an ultra-high-speed moving environment exceeding 10 m/s. The simulation results suggest that the conventional receiving apparatus has better bit error rate characteristics when the moving speed is extremely low. This is because the conventional receiving apparatus can perform ideal waveform equalization through compensation with a filter having the inverse characteristic of the propagation path, as long as it can update the filter in a timely fashion.

As described above, in the receiving apparatus 10 of the present embodiment, the tap length sufficiently shorter than the delay spread is used in the FIR filters 103 connected to the plurality of receivers 101. Also, a configuration is adopted in which the filter coefficient of the FIR filters 103 is adaptively optimized. Such a configuration can spatially remove the delayed wave, which is the root cause of the waveform distortion. The spatial removal of the delayed wave allows for high-speed communication in an underwater high-speed moving environment.

[Modifications]

In the present embodiment, the conversion portions 102 may be configured to perform only analog-to-digital conversion. The conversion portions 102 may be configured to perform frequency conversion on an analog signal and then perform analog-to-digital conversion.

The physical intervals of the M receivers 101 may be all equal or may be different from one another.

Furthermore, a configuration may be used in which a feedback filter for removing the residual error of the FIR filter (feedforward filter) as described in NPL 1 is connected in the subsequent stage.

The symbol estimation portion 105 and the filter coefficient calculation portion 106 of the receiving apparatus 10 are configured by using a processor such as a CPU and a memory. The symbol estimation portion 105 and the filter coefficient calculation portion 106 operate when the processor reads and executes a program stored in a storage device. The program may be recorded on a computer-readable recording medium. The computer-readable recording medium is a non-transitory storage medium, which may be a removal medium, such as a flexible disk, a magneto-optical disk, a ROM, or a CD-ROM, or a storage device and the like, such as a hard disk built in a computer system. The program may be transmitted over a telecommunication line. Part or all of the operations of the symbol estimation portion 105 and the filter coefficient calculation portion 106 may be implemented in hardware including an electronic circuit using LSI, ASIC, PLD, FPGA, or the like.

Some embodiments of the present invention are described above in detail with reference to the drawings, but specific configurations are not limited to these embodiments and include designs and the like within a range that does not deviate from the gist of the present invention.

INDUSTRIAL APPLICABILITY

The present invention is applicable to communication using sound waves in water.

REFERENCE SIGNS LIST

10 Receiving apparatus
101 Receiver
102 Conversion portion
103 FIR filter
104 Combiner
105 Symbol estimation portion
106 Filter coefficient calculation portion

The invention claimed is:

1. A receiving apparatus comprising:
M receivers configured to receive signals based on sound waves propagating in water;
M FIR filters configured to perform waveform operation on the signals received by the receivers;
a combiner configured to combine output signals of the M FIR filters; and
a filter coefficient calculator configured to calculate a tap coefficient of the M FIR filters so as to reduce an error of the output signals combined by the combiner,
wherein the M FIR filters have a tap length that is shorter than a delay spread that is a possible range between a time of arrival of a direct wave and a time of arrival of a delayed wave of the sound waves, where M is an integer greater than or equal to two.

2. The receiving apparatus according to claim 1, wherein the tap length is longer than a time obtained by dividing a distance that is largest among distances between every pairs of the M receivers by a sound velocity in water, where M as it relates to M receivers is an integer greater than or equal to three.

3. The receiving apparatus according to claim 1, wherein a value of M is a positive integer greater than a number of delayed waves to be processed.

4. The receiving apparatus according to claim 1, further comprising M converters configured to convert the sound waves received by the receivers into digital signals.

5. The receiving apparatus according to claim 4, wherein the converters are configured to further perform frequency conversion on signals of the sound waves.

* * * * *